UNITED STATES PATENT OFFICE.

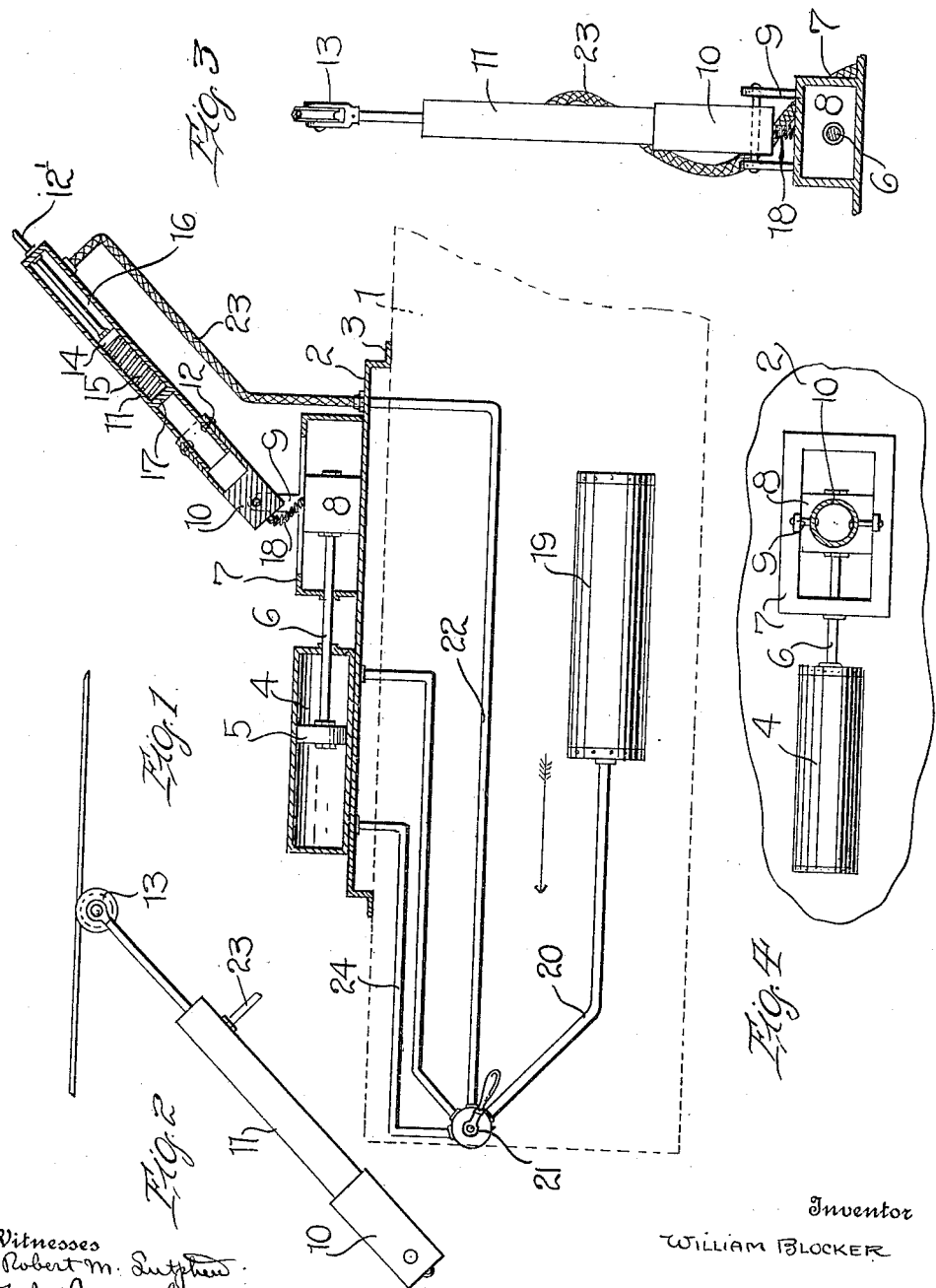

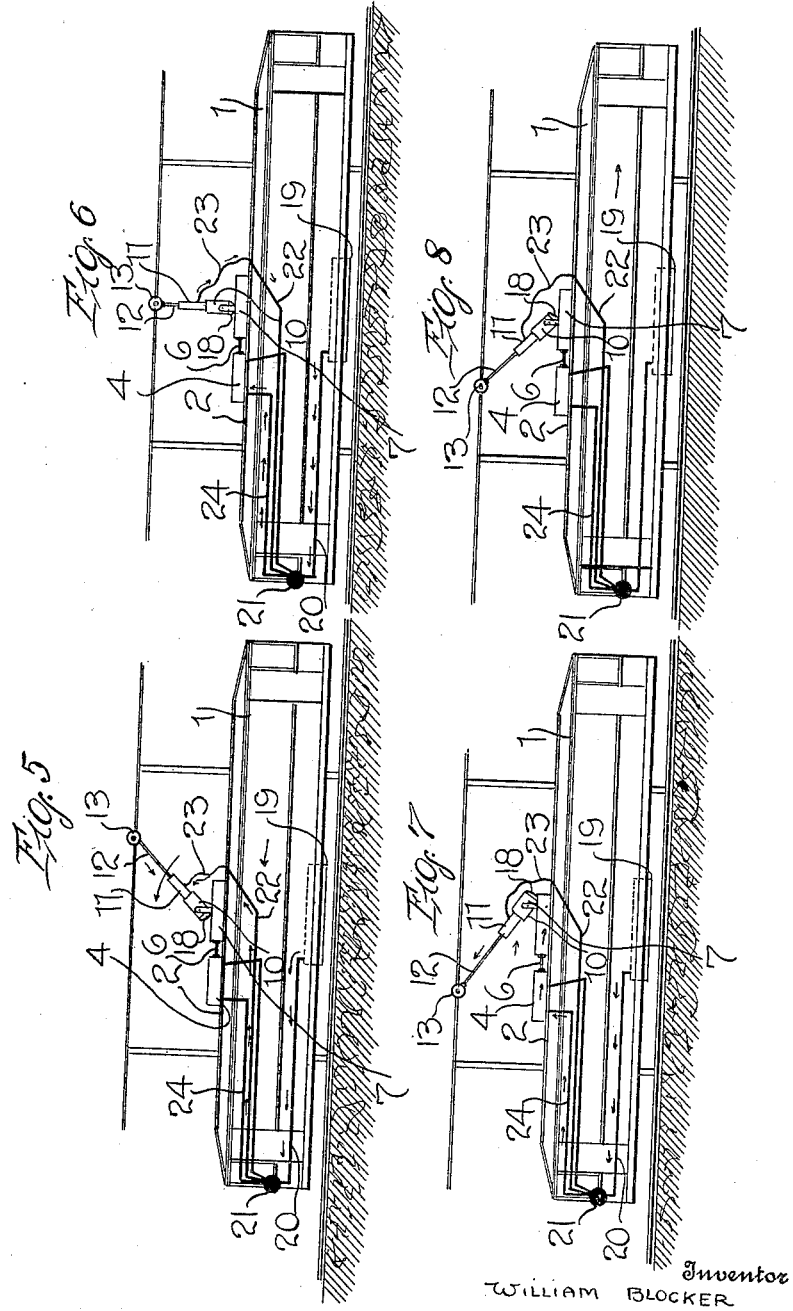

WILLIAM BLOCKER, OF JACKSON, MISSISSIPPI.

TROLLEY-POLE.

1,111,127.  Specification of Letters Patent.  Patented Sept. 22, 1914.

Application filed November 12, 1913. Serial No. 800,600.

*To all whom it may concern:*

Be it known that I, WILLIAM BLOCKER, a citizen of the United States, residing at Jackson, in the county of Hinds and State of Mississippi, have invented certain new and useful Improvements in Trolley-Poles, of which the following is a specification, reference being had to the accompanying drawings.

This invention relates to new and useful improvements in trolley poles and more particularly to the means of mounting and operating the same, the object of the invention being to provide a trolley pole which is mounted upon the top of the trolley car in such a manner that the same may be readily swung to its operative position according to the direction in which the car is to travel.

Another object of the invention is to provide a trolley pole which is pivotally mounted upon the top of the trolley car and which is provided with novel means for swinging the pole so that the same will be disposed in an operative position according to the direction in which the car is to travel.

A further object of the invention is the provision of a trolley pole wherein the positions of the pole may be quickly and readily reversed by the motorman of the car car and the pole arranged in its operative position according to the direction in which the car is going.

A still further object of the invention is the provision of a trolley pole of the above character which will possess advantages in points of efficiency and durability, is inexpensive to manufacture and at the same time is simple in construction and operation.

With the above and other objects in view, the invention consists in the novel features of construction and the combination and arrangement of parts to be hereinafter more fully described, pointed out in the claims and shown in the accompanying drawings, in which—

Figure 1 is a longitudinal sectional view, parts thereof being shown in elevation; Fig. 2 is a side elevation of the pole; Fig. 3 is a front elevation; Fig. 4 is a plan view of the operating means and Figs. 5 and 8 inclusive are diagrammatic views illustrating the various positions which the trolley pole assumes in its operation.

Referring more particularly to the drawings 1 indicates the trolley car upon the top of which is mounted a supporting platform 2, the transverse end portions of which are downwardly bent and are provided with out-turned flanges 3 which are adapted to rest upon the top of the car and to be secured thereto in any suitable manner. Mounted upon one end of the platform is a cylinder 4 in which is reciprocated a piston 5 having a piston rod 6 which extends into one end of the casing 7, said casing being mounted upon the platform 2 and arranged in longitudinal alinement with the cylinder 4.

Mounted for reciprocation within the casing 7 is a piston 8 which is preferably rectangular in form and is connected to the end of the piston rod 6 opposite the piston 5.

Extending upwardly from the top of the casing 7 are the spaced arms 9 between the upper ends of which is pivotally mounted a socket 10 in the upper end of which is disposed the tubular pole 11, said pole being riveted, as shown at 12, or otherwise secured to the socket member 10.

Mounted for reciprocatory movement in the outer end of the pole 11 is the wheel supporting rod 12′ upon the outer end of which is mounted the trolley wheel 13. The inner end of said rod is provided with a bearing washer 14 which is arranged within the outer end of the pole 11 and bears against the coil spring 15 which is arranged within the chamber 16 formed in the outer end of the pole by the partition 17. The socket member 10 is connected at its lower end with the piston 8 by means of the coil spring 18.

In operating my improved trolley pole, I provide a compressed air storage tank 19 which is connected by means of a pipe 20 to a controller 21, preferably located in the front end of the car, adjacent the electric controller and by forming communication between the controller 21 and the chamber 16, through the medium of the pipe 22 and hose 23, compressed air may be readily admitted to the upper end of the chamber so as to reciprocate the washer 14 in the desired direction and, at the same time, removing the trolley wheel 15 from the wire. After this operation has been carried out and the trolley wheel 13 has been removed from the wire, air is admitted into either end of the cylinder 4 to reciprocate the piston 5 which, through the connecting rod 6, will reciprocate the piston 8 and as the pole 11 is pivotally mounted, it will be readily swung upon its pivot through the medium of the coil spring 18. From this, it will be apparent that by admitting air into either end of the cylinder 4, the trolley pole 11 may be swung to either side according to the direction in which the car is traveling.

In Fig. 1, I have illustrated a trolley pole disposed in an angular position, so that the car will travel in the direction illustrated by the arrow, should it be desired to reverse the pole, air is first admitted into the chamber 16 to release the trolley wheel from the wire, air will then be admitted into the left hand end of the cylinder 4 through the pipe 24 to reciprocate the piston 5 to the opposite end of the cylinder, which in turn will push the cylinder 8 toward the rod and pull the lower end of the trolley pole in the same direction, thus swinging the upper end of the pole in the opposite direction. From this it will be seen that no matter in which direction the car is to travel, the trolley pole may be quickly and readily swung to its operative position without necessitating the motorman leaving the car.

From the above description taken in connection with the accompanying drawings, it will be readily apparent that I have provided a simple and durable trolley pole which is pivotally mounted upon the top of the car and is provided with novel operating means whereby the same may be readily swung to its operative position according to the direction in which the car is traveling. The pole may be readily operated by the motorman without the necessity of leaving the car. It will also be apparent that the device is extremely simple in construction, can be quickly and readily applied to any well known form of trolley car now in use and can be manufactured at a comparatively low cost.

While I have shown and described the preferred form of my invention, it will be obvious that various changes in the details of construction and in the proportions may be resorted to for successfully carrying my invention into practice without sacrificing any of the novel features or departing from the scope of the appended claims.

What I claim is:—

1. A device of the class described including a car, a supporting platform upon the top thereof, a cylinder mounted upon one end of the platform, a casing mounted upon the other end, pistons slidably mounted within said cylinder and casing, a rod connecting said pistons, arms projecting upwardly from the casing, a socket pivotally mounted between said arms, a coil spring connecting the piston within the casing with said socket, a trolley pole mounted in the outer end of the socket and means for reciprocating said pistons to swing the pole to an operative position.

2. A device of the class described including a car, a cylinder mounted thereon, a casing arranged adjacent the cylinder, pistons mounted for sliding movement within the cylinder and casing, arms projecting upwardly from the casing, a socket member having its lower end pivotally mounted between said arms, a coil spring connecting the socket with the piston in the casing, a tubular pole mounted in the upper end of said socket, a supporting rod mounted for reciprocating movement within the outer end of the pole, a trolley wheel upon the outer end of the rod, means for reciprocating said rod within the pole to disengage the trolley wheel from the wire and additional means for reciprocating said pistons within the cylinder and casing whereby the pole will be swung to an operative position.

In testimony whereof I hereunto affix my signature in the presence of two witnesses.

WILLIAM BLOCKER.

Witnesses:
 CORIE GORDON,
 IKE BRUNSON.

Copies of this patent may be obtained for five cents each, by addressing the "Commissioner of Patents, Washington, D. C."